United States Patent
Chen et al.

(10) Patent No.: US 11,520,895 B2
(45) Date of Patent: Dec. 6, 2022

(54) SYSTEM AND METHOD FOR DYNAMIC VERIFICATION OF TRUSTED APPLICATIONS

(71) Applicant: Samsung Electronics Co., Ltd., Suwon-si (KR)

(72) Inventors: Geng (Ken) Chen, San Jose, CA (US); Michael C. Grace, Sunnyvale, CA (US); Chu Ly Tran, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/113,980

(22) Filed: Dec. 7, 2020

(65) Prior Publication Data

US 2022/0179963 A1 Jun. 9, 2022

(51) Int. Cl.
| | |
|---|---|
| *G06F 9/00* | (2006.01) |
| *G06F 15/177* | (2006.01) |
| *G06F 21/57* | (2013.01) |
| *G06F 9/4401* | (2018.01) |

(52) U.S. Cl.
CPC .......... *G06F 21/575* (2013.01); *G06F 9/4406* (2013.01); *G06F 21/572* (2013.01); *G06F 2221/033* (2013.01)

(58) Field of Classification Search
CPC .............................. G06F 21/575; G06F 9/4406
See application file for complete search history.

(56) References Cited

U.S. PATENT DOCUMENTS

| | | | |
|---|---|---|---|
| 7,200,761 B1 | 4/2007 | Freeman et al. | |
| 8,321,931 B2 | 11/2012 | Zimmer et al. | |
| 8,522,025 B2 | 8/2013 | Lakshmeshwar et al. | |
| 2006/0026417 A1 | 2/2006 | Furusawa et al. | |
| 2007/0198851 A1* | 8/2007 | Goto | G06F 12/145 713/168 |
| 2007/0235517 A1* | 10/2007 | O'Connor | G06Q 10/06 235/375 |
| 2008/0077801 A1 | 3/2008 | Ekberg | |
| 2009/0138731 A1* | 5/2009 | Jin | G06F 21/51 713/194 |

(Continued)

FOREIGN PATENT DOCUMENTS

WO 2019226042 A1 11/2019

OTHER PUBLICATIONS

International Search Report and Written Opinion of the International Searching Authority regarding International Patent Application No. PCT/KR2021/015283 dated Feb. 16, 2022, 7 pages.

*Primary Examiner* — Mohammed H Rehman

(57) ABSTRACT

An electronic device, a method, and a non-transitory, computer-readable medium storing instructions for dynamically verifying trusted applications (TAs) during a boot sequence. The electronic device includes a memory and a processor operably connected to the memory. The processor executes instructions stored in the memory to cause the electronic device to initialize a kernel boot sequence in response to confirming that executable codes for booting the electronic device are from a trusted binary and then verify one or more registered TAs during the kernel boot sequence. Completion of the kernel boot sequence is based on verification results of the set of registered TAs.

20 Claims, 9 Drawing Sheets

(56) References Cited

U.S. PATENT DOCUMENTS

| | | | |
|---|---|---|---|
| 2014/0068276 A1* | 3/2014 | Imamoto | G06F 21/6209 |
| | | | 713/192 |
| 2014/0250290 A1 | 9/2014 | Stahl et al. | |
| 2016/0170786 A1* | 6/2016 | Gulam | G06F 9/44521 |
| | | | 713/2 |
| 2016/0306976 A1 | 10/2016 | Gantman et al. | |
| 2017/0344407 A1 | 11/2017 | Jeon et al. | |
| 2018/0204009 A1 | 7/2018 | Xu | |
| 2019/0384909 A1* | 12/2019 | Ndu | G06F 21/57 |
| 2020/0050798 A1 | 2/2020 | Jiang et al. | |
| 2020/0218443 A1* | 7/2020 | Narayan | G06F 3/04886 |
| 2020/0322423 A1* | 10/2020 | Sheth | H04L 67/1002 |
| 2021/0012011 A1* | 1/2021 | Huang | G06F 21/575 |
| 2021/0192050 A1* | 6/2021 | Hird | G06F 21/606 |

\* cited by examiner

SYSTEM AND METHOD FOR DYNAMIC VERIFICATION OF TRUSTED APPLICATIONS

TECHNICAL FIELD

The present disclosure relates generally to securing electronic devices, and more specifically, verification of trusted applications during bootup of the electronic devices.

BACKGROUND

The modern mobile device hardware technology allows a system of an electronic device to be partitioned into two virtual execution environments, conventionally named the "secure world" and the "normal world", i.e., non-secure world. The separate execution environment allows for isolation of unsecured client applications running in the normal world from the secure, trusted applications (TAs) running in the secure world. TAs are often tasked with handling sensitive, personal, or proprietary data. Examples of TAs include KEYMASTER TA and KNOX GUARD TA. Operating in a secure world helps to establish confidentiality and also integrity of code and data.

During bootup of the electronic device, BootROM code is executed from a hardcoded location to load a bootloader. The bootloader contains instructions to detect RAM and execute processes to complete the boot sequence. In some electronic devices, a primary bootloader detects RAM and loads a secondary bootloader into RAM. The secondary bootloader may carry out one or more security processes and initiate a kernel before loading an operating system (OS) into the normal world. Two such security processes, Secure Boot and Trusted Boot, are currently used to verify that an electronic device is running trusted software.

Secure Boot is a process that verifies that the software used to load the normal world operating system is trusted. For example, each bootloader in a series of bootloaders cryptographically verifies the signature of the next bootloader in the sequence using a certificate chain with its root-of-trust in hardware. This process ensures that all executed codes come from a trusted binary. If verification fails at any step, the boot process can be terminated.

Trusted Boot is a process that verifies that a bootloader, kernel, and OS are all from the same build. Trusted Boot prevents a malicious actor from using an older, trusted bootloader that may have security vulnerabilities from loading compromised code.

Secure Boot and Trusted Boot do not verify individual Trusted Application (TA) running in the secure world, allowing an electronic device to operate with potentially compromised TAs. As the complexity of the initialization and boot procedures of electronic devices increases, malicious actors can find ways to leverage versioning inconsistencies and leaks to compromise electronic devices.

SUMMARY

This disclosure provides systems and methods for securing electronic devices, and more specifically, verification of trusted applications during bootup of the electronic devices.

In a first embodiment, an electronic device includes a memory storing instructions. The electronic device also includes a processor operably connected to the memory. The processor is configured to execute the instructions to cause the electronic device to initialize a kernel boot sequence in response to confirming that executable codes for booting the electronic device are from a trusted binary and then verify one or more registered TAs during the kernel boot sequence. Completion of the kernel boot sequence is based on verification results of the set of registered TAs.

In a second embodiment, a method for booting an electronic device includes initializing, by a bootloader, a kernel boot sequence in response to confirming that executable codes for booting the electronic device are from a trusted binary. The method also includes verifying, by a trusted application dynamic verification module (TDVM), one or more registered TAs during the kernel boot sequence, wherein completion of the kernel boot sequence is based on verification results of the set of registered TAs.

In a third embodiment, a non-transitory, computer-readable medium includes instructions that, when executed by a processor of an electronic device, causes the electronic device to initialize, by a bootloader, a kernel boot sequence in response to confirming that executable codes for booting the electronic device are from a trusted binary. The instructions further cause the processor to verify, by a TDVM, a set of registered TAs during the kernel boot sequence, wherein completion of the kernel boot sequence is based on verification results of the set of registered TAs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "set of" means one or more. Thus, "a set of trusted applications" can mean one trusted application, or two or more trusted applications.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smart phone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
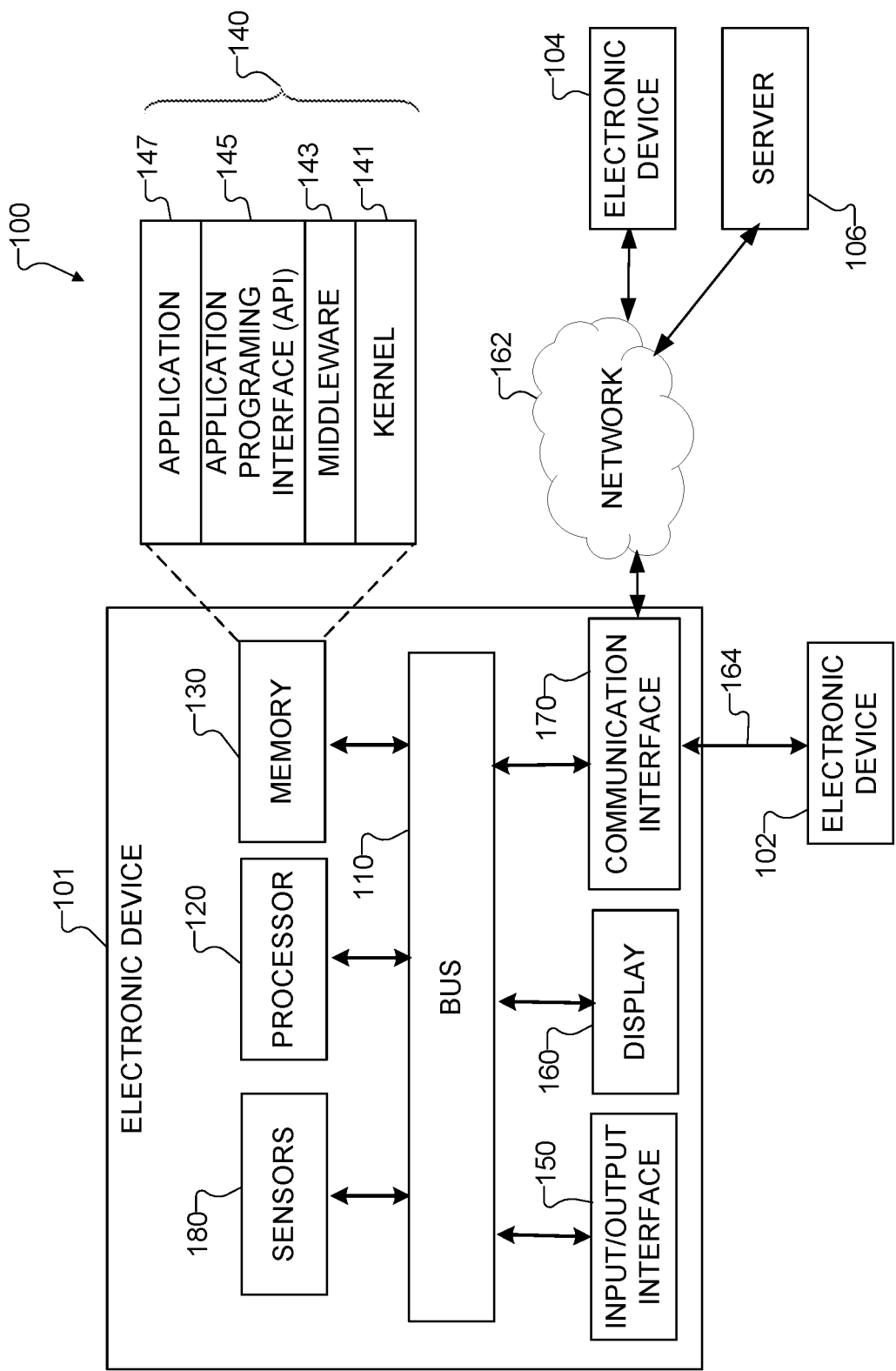
FIG. 1 illustrates an example network configuration in accordance with various embodiments of this disclosure.

FIGS. 1 through 9, discussed below, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

Conventional boot sequences do not verify the integrity, authenticity, and validity of TAs. Thus, an attack on critical TAs executing on an electronic device, such as KEYMASTER TA or KNOXGUARD TA can compromise the electronic device. As an example, KNOXGUARD TA provides functionality that allows mobile carriers to manage financed devices. Mobile carriers can use KNOXGUARD TA to lock a mobile device down in the event that a customer fails to tender payment. KNOXGUARD TA can be compromised by deleting the KNOXGUARD TA, injecting a compromised version of the KNOXGUARD TA, then gain access to the critical data accessed by KNOXGUARD TA.

The number of attacks on TAs have been increasing along with the growing number of TAs being developed for executing in the secure world. The attacks attempt to exploit any potential vulnerabilities in the secure world, such as by removing downloadable TA(s), corrupting a TA's secure data, or attacking a TA's state machine. A few types of malicious attacks on TAs are described below, which involve loading a wrong TA into secure memory despite having the correct TA identifier (ID).

Similar to the Secure Boot process that verifies that software on a mobile device is properly signed, secure OS signature verification will confirm that a TA is properly signed before loading. However, this process can be circumvented in a number of different ways. First, a malicious insider or a compromised internal account, who has the authority to sign a TA, signs a malicious TA with the proper TA ID, then loads it on market devices to attack them. Second, a TA from the wrong context is maliciously loaded onto a market device to attack it or something it depends upon. For example, loading a testing TA, or loading the same TA built for a different model. Third, a different version of the right TA is maliciously loaded onto a market device to attack it or something it depends upon. Fourth, a completely invalid version of that TA ID is loaded, and the Secure OS rejects it, causing a denial-of-service or breaking something it depends upon.

Additionally, conventional boot sequences do not include any mechanism to verify that TAs executing on the electronic device are operating correctly. For example, a TA executing in the secure world have a set of minimum functionalities, such as generating secure random numbers, accessing cryptographic functionalities, accessing a replay protected memory block (RPMB), or decrypting and authenticating wrapped data.

Certain embodiments of this disclosure are directed to a dynamic verification of TAs that can obviate the first three types of attacks on TAs and at least mitigate the effects of the fourth type of attack because the "fail to load" behavior is standardized in a streamline manner, e.g., the TA loader and correct TA agree on what should be loaded and the TA's ability to function via self-validation. In particular, the novel aspects of this disclosure are directed to dynamic verification of TAs executing in secure world as an additional layer of the boot verification process. If the dynamic verification of TAs fails, remedial measures can be taken. For example, in one embodiment, the boot process can be stopped. In another embodiment, one or more compromised TAs can be disabled and the boot process can be allowed to proceed. In addition, the dynamic verification of TAs also confirms that the TAs are operating correctly.

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or a sensor 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, an active matrix OLED (AMOLED), a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

As described in more detail below, the electronic device 101 can include hardware and software configured to perform verification of trusted applications as a part of a kernel boot sequence to confirm the integrity, authenticity, and rollback prevention version of the TA.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
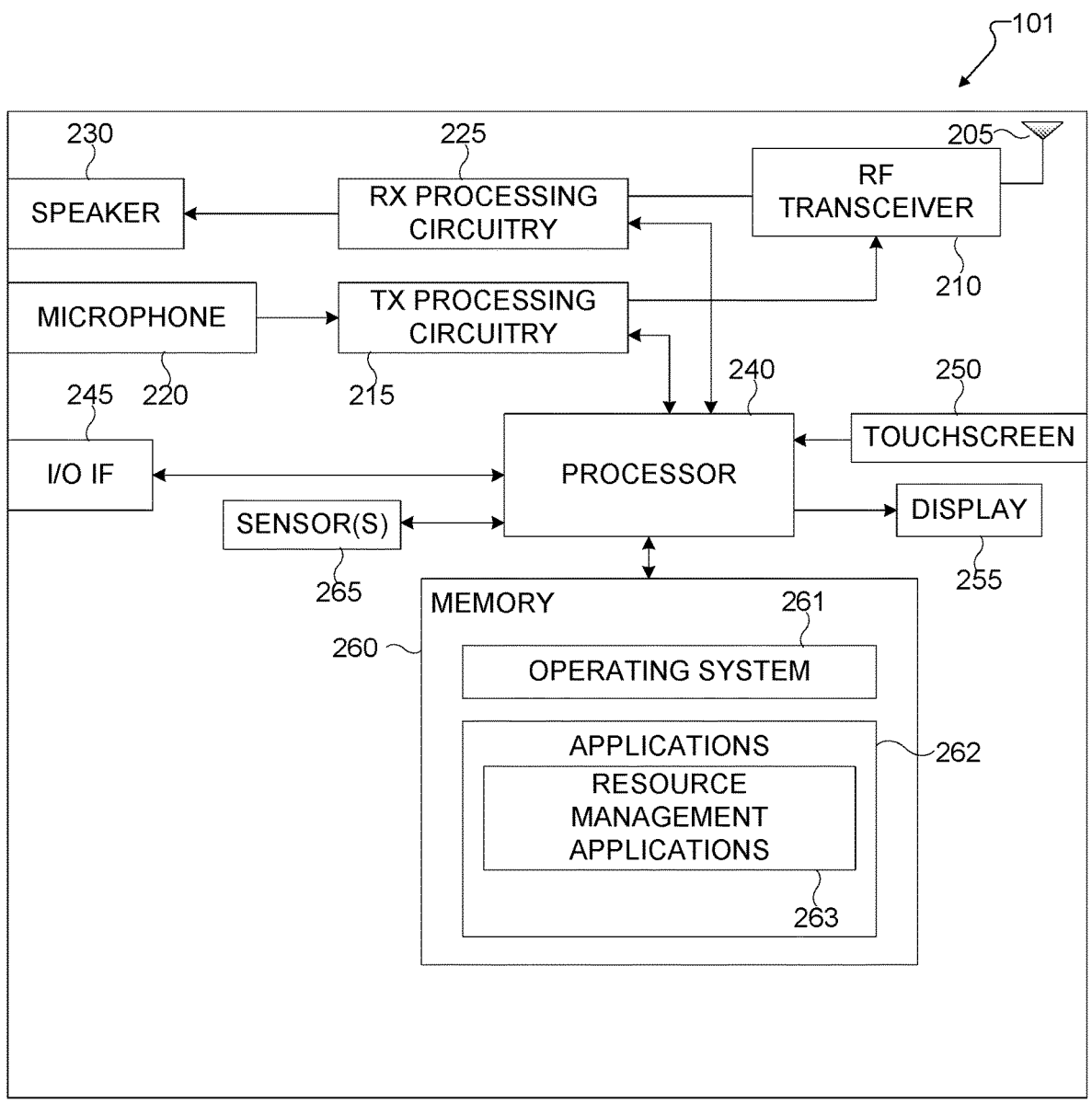
FIG. 2 illustrates an example electronic device in accordance with various embodiments of this disclosure.

FIG. 2 illustrates an example electronic device 101 in accordance with this disclosure. The electronic device 101 could represent one or more of the electronic devices 101, 102, or 104 in FIG. 1. As shown in FIG. 2, the electronic device 101 includes an antenna 205, a radio frequency (RF) transceiver 210, transmit (TX) processing circuitry 215, a microphone 220, and receive (RX) processing circuitry 225. The electronic device 101 also includes a speaker 230, a processor 240, an input/output (I/O) interface (IF) 245, an input 250, a display 255, and a memory 260. The memory 260 includes an operating system (OS) program 261 and one or more applications 262.

The RF transceiver 210 receives, from the antenna 205, an incoming RF signal transmitted by another component in a system. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processors and execute the OS program 261 stored in the memory 260 in order to control the overall operation of the electronic device 101. For example, the processor 240 could control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS program 261 or in response to signals received from external devices or an operator. The processor can execute a resource management application 263 for monitoring system resources. The processor 240 is also coupled to the I/O interface 245, which provides the electronic device 101 with the ability to connect to other devices such as laptop computers, handheld computers and other accessories, for example, a virtual reality (VR) headset. The I/O interface 245 is the communication path between these accessories and the processor 240. The processor 240 can recognize accessories that are attached through the I/O interface 245, such as a VR headset connected to a USB port.

The processor 240 is also coupled to the input 250 and the display 255. The operator of the electronic device 101 can use the input 250 (e.g., keypad, touchscreen, button etc.) to enter data into the electronic device 101. The display 255 may be an LCD, LED, OLED, AMOLED, MEMS, electronic paper, or other display capable of rendering text and/or at least limited graphics, such as from web sites.

The memory 260 is coupled to the processor 240. Part of the memory 260 could include a random access memory (RAM), and another part of the memory 260 could include a Flash memory or other read-only memory (ROM).

The electronic device 101 further includes one or more sensors 265 that can meter a physical quantity or detect an activation state of the electronic device 101 and convert metered or detected information into an electrical signal. For example, the sensor 265 may include any of the various sensors 180 discussed above.

As described in more detail below, the electronic device 101 can include hardware and software configured to perform verification of trusted applications as a part of a kernel boot sequence to confirm the integrity, authenticity, and rollback prevention version of the TA.

Although FIG. 2 illustrates one example of an electronic device 101, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the electronic device 101 configured as a mobile telephone or smart phone, electronic devices could be configured to operate as other types of mobile or stationary devices. In addition, as with computing and communication networks, electronic devices can come in a wide variety of configurations and FIG. 2 does not limit this disclosure to any particular electronic device.

Figure 3:
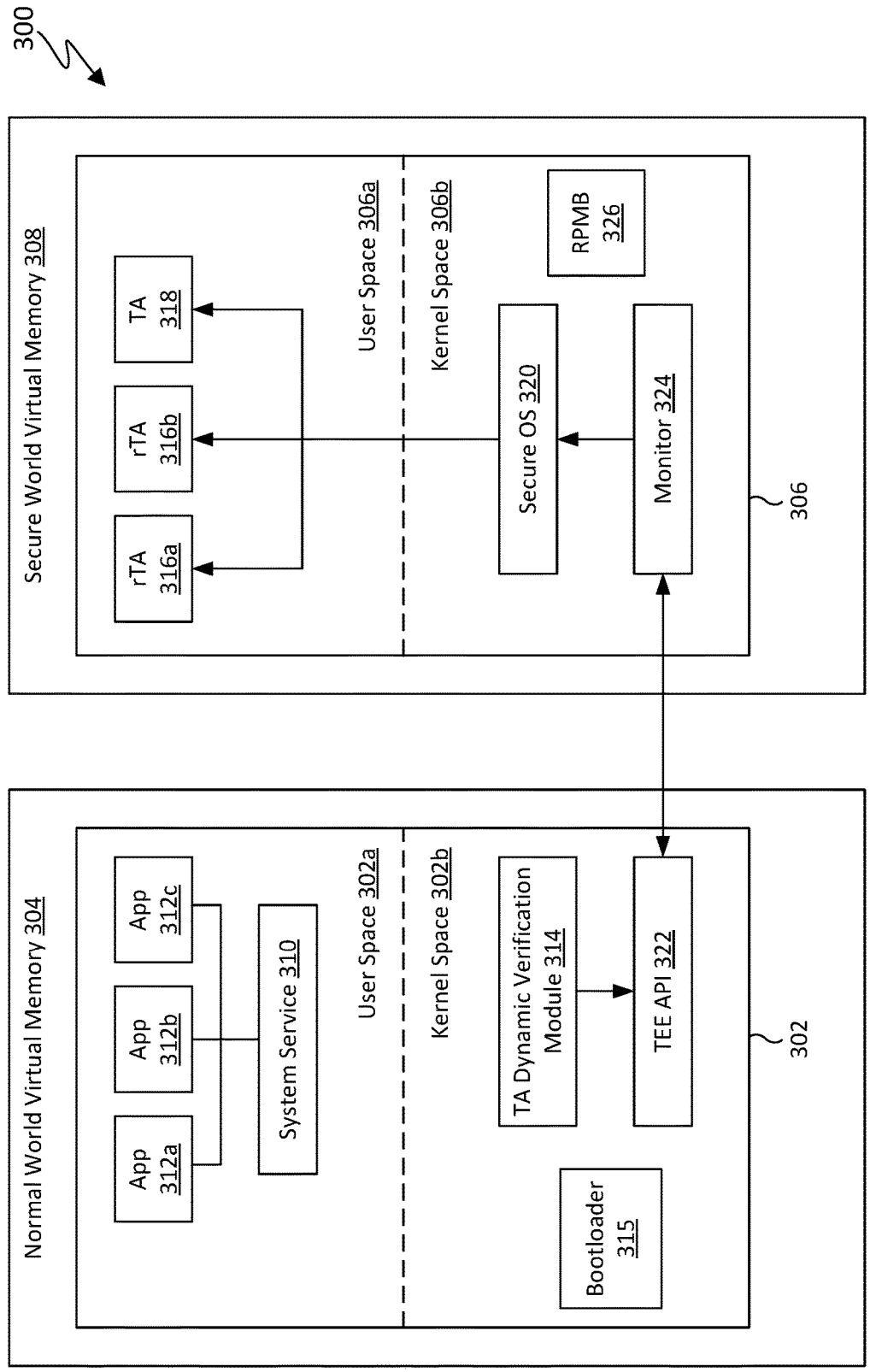
FIG. 3 illustrates an execution environment for dynamically verifying trusted applications in an electronic device according to various embodiments of this disclosure.

FIG. 3 illustrates an exemplary execution environment for dynamically verifying TAs in an electronic device according to various embodiments of this disclosure. The embodiment of the execution environment 300 shown in FIG. 3 is for illustration only and other embodiments could be used without departing from the scope of the present disclosure. The execution environment 300 can be implemented in an electronic device, such as electronic device 101 in FIG. 2.

The execution environment 300 can be separated into a normal world 302 running in normal world virtual memory 304, and a secure world 306 running in secure world virtual memory 308. The normal world 302 may be further divided into a user space 302a and a kernel space 302b. The secure world 306 can also be divided into secure user space 306a and secure kernel space 306b.

A system service 310 and a set of user applications 312a, 312b, and 312c can be loaded into user space 302a. In certain embodiments, the system service 310 can be a mobile operating system, such as an ANDROID operating system (OS). The system service 310 may also be referred to as an unsecured OS.

TA dynamic verification module (TDVM) 314 may be a loadable kernel module located in the kernel space 302b. The TDVM 314 can be loaded by bootloader 315 as soon as the kernel boots up, prior to loading the system service 310. In some embodiments, the TDVM 314 may be signed with the platform key for integrity guarantee through device mapper verity (dm-verity). The TDVM 314 may be configured to carry out a TA dynamic verification process that verifies, as a part of the boot process, registered TAs (rTAs) running in the secure world 306. In this example in FIG. 3, rTAs 316a and 316b are registered. In one embodiment, TAs are registered prior to binary build. TA 318 is also a trusted application, but because TA 318 has not been previously registered, TA 318 does not need to be verified during the boot process.

According to certain embodiments, rTAs 316a and 316b and TA 318 can be loaded into secure user space 306a by a secure OS 320 running in kernel space 306b. The secure OS 320 loads one or more TAs into memory when requested. The request for loading at least the registered TAs can be generated by the TDVM 314 during the TA dynamic verification process. The request for loading at least the registered TAs is forwarded by trusted execution environment (TEE) application program interface (API) 322 from the normal world 302 to the secure world 306. The request is received by a monitor 324 in the kernel space 306b of the secure world 306. Monitor 324 is a software module running in the secure world that can receive secure monitor calls (SMCs) originating from the non-secure kernel.

The TA dynamic verification process verifies: that each registered TA is signed correctly, that a corresponding Rollback Prevention Version is correct; that the TA can be loaded and unloaded; and that basic required functionalities are working as designed. As a part of the dynamic verification process, each of the registered TAs will be instructed to implement a self-verification function and return the pass/fail result. The self-verification function may be based on individual TA requirements. Examples of this self-verification function can include: confirmation that the registered TA can access a replay protected memory block (RPMB) 326; confirmation that the registered TA state is valid; confirmation that persistent data is valid; confirmation that the registered TA can unwrap corresponding secure object(s); confirmation that the registered TA can communicate with other TAs; and confirmation that cryptographic/mathematical functionalities are operating as intended. In some embodiments, the failure to verify any of the registered TAs can cause the entire boot process to terminate.

Figure 4:
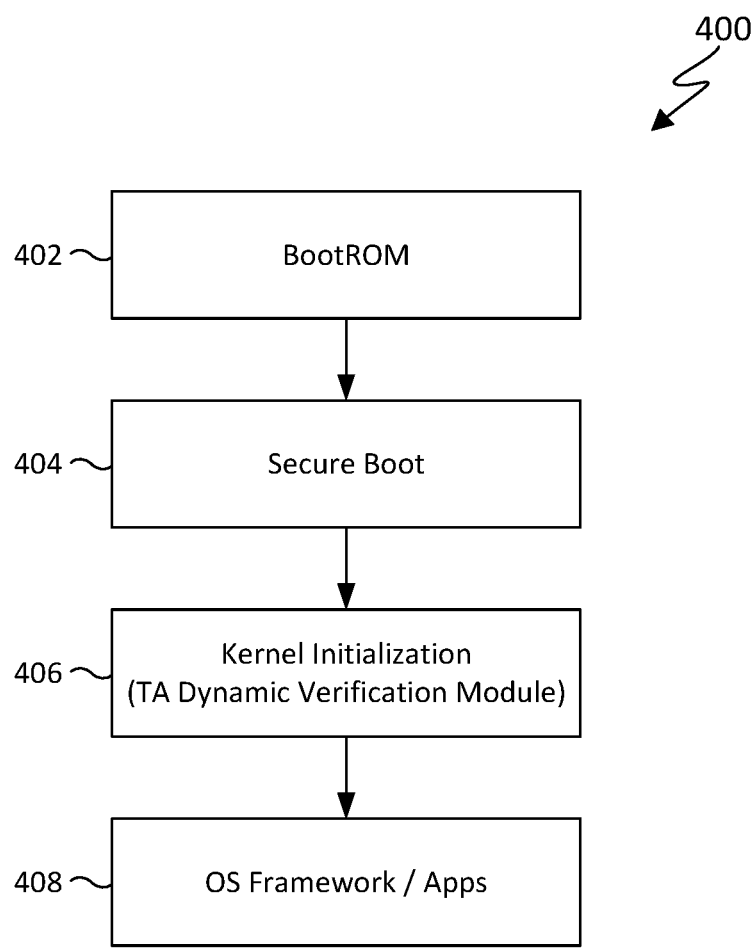
FIG. 4 illustrates stages of a process for booting an electronic device according to various embodiments of this disclosure.

FIG. 4 illustrates boot stages for an electronic device according to various embodiments of this disclosure. While the flow chart depicts a series of sequential steps, unless explicitly stated, no inference should be drawn from that sequence regarding specific order of performance, performance of stages, steps, or portions thereof serially rather than concurrently or in an overlapping manner, or performance of the steps depicted exclusively without the occurrence of intervening or intermediate steps. The boot stages shown 400 can be implemented by an electronic device, such as electronic device 101 in FIG. 2. More specifically, stages 404, 406, and 408 can be implemented by a bootloader, such as bootloader 315 in FIG. 3.

In stage 402 a BootROM is loaded. In stage 404, a Secure Boot process is executed. In certain embodiments, the Secure Boot process can be a SAMSUNG Verified Boot process or an ANDROID Verified Boot Process.

In stage 406, a kernel is initialized after the Secure Boot process is successfully carried out. The TDVM is invoked during stage 406 to verify the registered TAs loaded in the secure world. In certain embodiments, the TDVM verifies each registered TA identified in a list of registered TAs by calling the registered TA's self-verification function. If the result of the self-verification function indicates "pass" then the TDVM continues on to the next registered TA in the list of registered TAs and then continues on to the next stage of the boot process based on the results of the self-verification functions. In some embodiments, if the result of any self-verification function indicates "fail" then the TDVM can terminate the kernel boot sequence without verifying any remaining registered TAs and without proceeding to stage 408. Further, failure to verify one or more of the registered TAs can result in the electronic device powering down or locking down. In other embodiments, if the results of any self-verification function indicate that verification of a corresponding registered TA fails, then the corresponding registered TA can be disabled and the kernel boot sequence may still be completed to allow the boot process to proceed to stage 408.

In stage 408, the OS framework and client applications are loaded in the normal world.

Figure 5A:
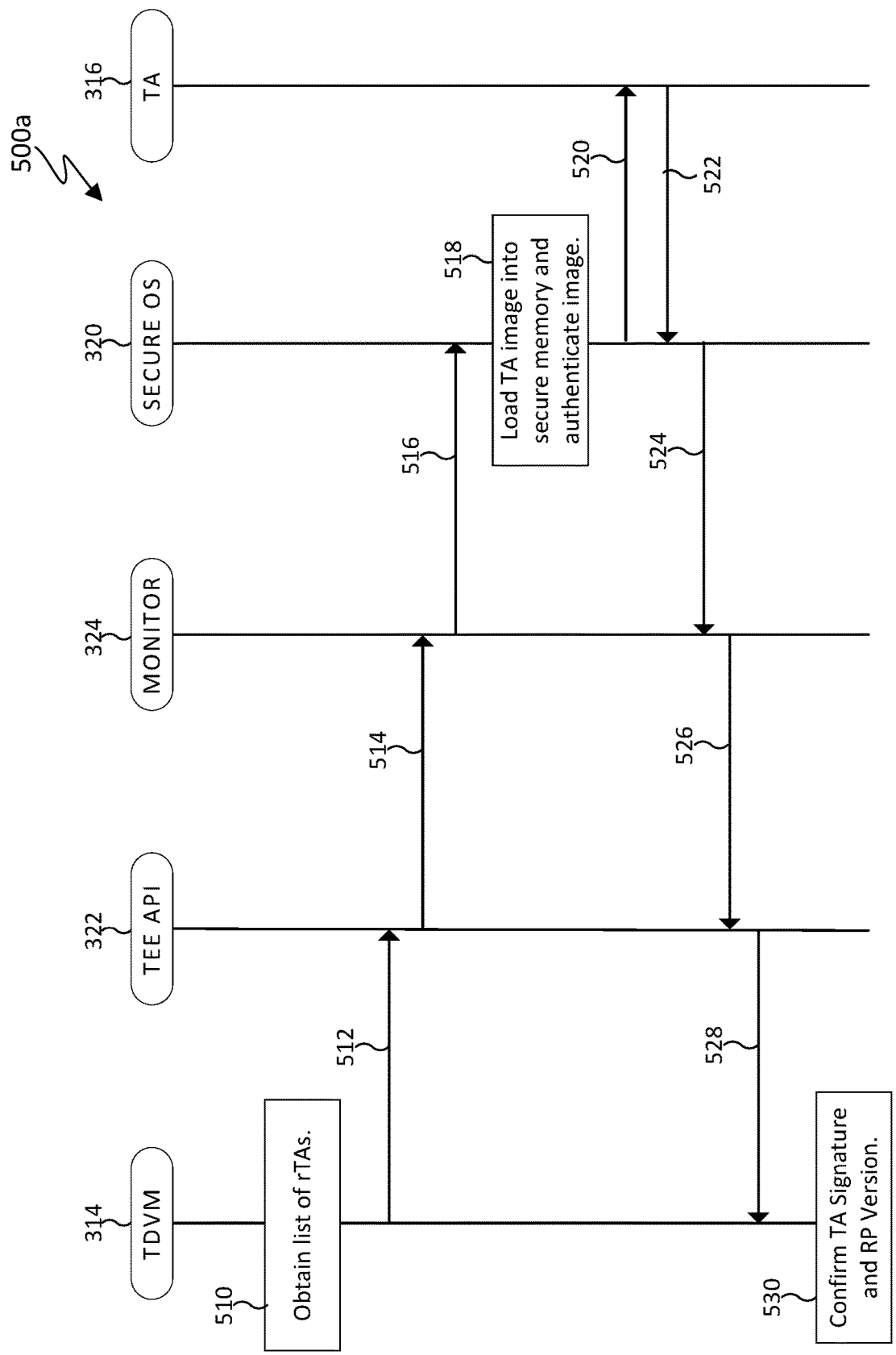
FIG. 5A illustrates a signal flow diagram for loading a set of registered TAs into memory as part of a process for verifying a set of trusted applications according to various embodiments of this disclosure.

FIG. 5A illustrates a signal flow diagram of loading registered TAs as a part of the dynamic verification process of TAs according to various embodiments of this disclosure. While the signal flow chart depicts a series of sequential signals or steps, unless explicitly stated, no inference should be drawn from that sequence regarding specific order of performance, performance of signals, steps, or portions thereof serially rather than concurrently or in an overlapping manner, or performance of the steps depicted exclusively without the occurrence of intervening or intermediate signals or steps. The steps of the signal flow diagram 500a can be implemented in an electronic device, such as electronic device 101 in FIG. 2.

TDVM 314 obtains a list of registered TAs in block 510. The list of registered TAs is populated before the binary build. The list of registered TAs can include one or more registered TAs. For each registered TA in the list of registered TAs, the TDVM 314 generates a TA loading request 512 that is sent to the TEE API 322 to forward from the unsecured kernel to the secured kernel. The TA loading request is forwarded 514 to the monitor 314 in the secure kernel. The monitor 324 routes 516 the TA loading request to the secure OS 320. In block 518 the secure OS 320 checks the TA signature and the RP version, and then loads 520 the registered TA 316 into memory upon successful verification. Thereafter, a thread is created, and the registered TA 316 is initialized. In response, the load result and application ID of the registered TA 316f is returned 522 to the secure OS 320. The secure OS 320 forwards the load result 524 and application ID to the monitor 324, and the monitor 324 forwards 526 the load result and application ID to the TEE API 322. Lastly, the TEE API 322 forwards 528 the load result and application ID to the TDVM 314. In block 530, upon receipt of the load result and application ID, the TDVM 314 confirms that registered TA 316 is successfully loaded and that the TA signature and RP version are correct. The success of TA loading indicates that the loaded TA passes integrity, authenticity, and RP version check. These checks prevent malicious attacks, such as malicious TA, invalid version of TA mentioned earlier that Secure Boot and dm-verity cannot detect as part of the boot process.

In some embodiments, failure to load the registered TA 316 into secure memory causes the boot process to immediately terminate. In other embodiments, the failure to load the registered TA 316 into memory causes the bootloader to enter an emergency download mode to obtain a loadable version of registered TA 316. In other embodiments, the boot process can be allowed to complete with the TA disabled.

Figure 5B:
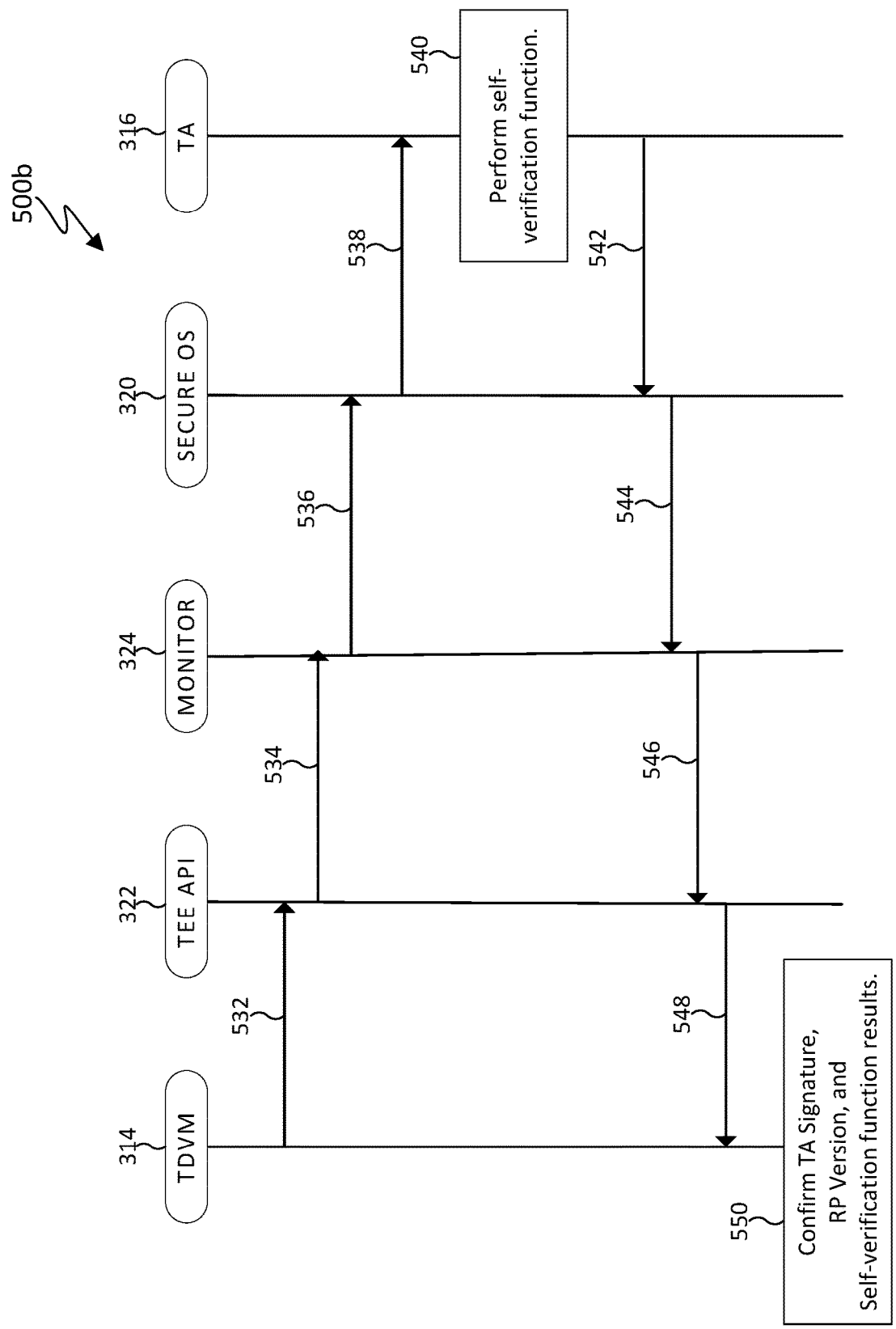
FIG. 5B illustrates a signal flow diagram for calling a self-verification function for a set of registered TAs loaded into memory as part of a process for verifying a set of registered TAs according to various embodiments of this disclosure.

FIG. 5B illustrates a signal flow diagram for calling a self-verification function as a part of the dynamic verification process according to various embodiments of this disclosure. While the signal flow chart depicts a series of sequential signals or steps, unless explicitly stated, no inference should be drawn from that sequence regarding specific order of performance, performance of signals, steps, or portions thereof serially rather than concurrently or in an overlapping manner, or performance of the steps depicted exclusively without the occurrence of intervening or intermediate signals or steps. The steps of the signal flow diagram 500b can be implemented in an electronic device, such as electronic device 101 in FIG. 2.

Once the registered TA is successfully loaded, TDVM will generate a command to cause the TA to conduct a set of self-verification functions that confirms that the TA is able to function correctly. Each TA owner can define its own set of self-verification functions. Some examples of the self-verification functions include performing a test on secure random API, conducting some cryptographic functions, verifying that the replay prevention memory block (RPMB) is accessible and the data stored in RPMB is valid, verifying that SFS is accessible, and confirming that the TA is able to wrap/unwrap secure object(s). The self-verification function prevents attacks such as invalid context to ensure validity of the TA, which Secure Boot and dm-verity cannot detect as part of the boot process.

The self-verification function command is transmitted 532 from TDVM 314 to the TEE API 322. The TEE API 322 forwards 534 the command to the monitor 324, which is then passed 536 to the secure OS 320. The secure OS 320 sends 538 the self-verification function command to the registered TA 316. In block 540, upon receipt of the self-verification function command, the registered TA 316 performs the self-verification function. Results of the self-verification function are returned 542 to the secure OS. The results can indicate if the registered TA 316 passed the self-verification function or failed the self-verification function. In some embodiments, if the registered TA 316 failed the self-verification function, then the results can also include diagnostic information or an error code related to the failure. The self-verification function results can be forwarded 544 from the secure OS 320 to the monitor 324, and then further forwarded 546 to the TEE API 322. The results are finally returned 548 to the TDVM. If the results indicate that the registered TA 316 passed its corresponding self-verification function, then, in block 550, the TDVM 314 can confirm that the registered TA 316 is verified because the TA signature is verified, the RP version is confirmed, and that the self-verification function has been passed. After the registered TAs have been dynamically verified during the kernel boot process, the unsecured OS and client applications can be loaded.

Figure 6:
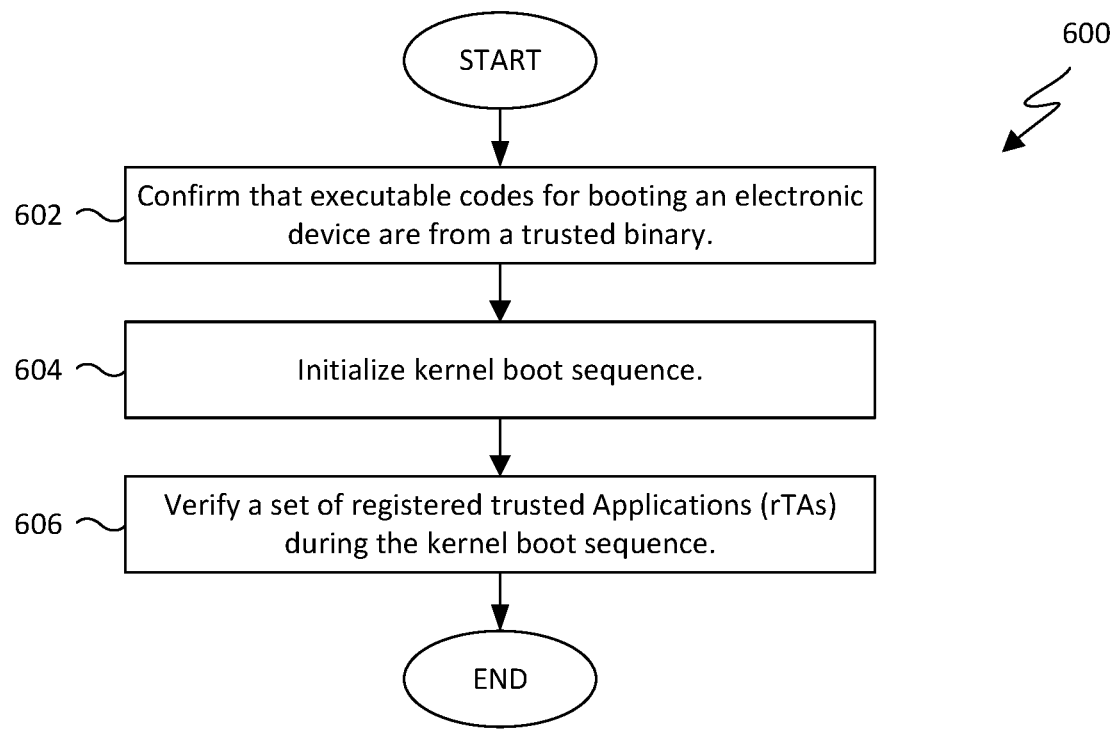
FIG. 6 illustrates a flowchart of a process for dynamically verifying TAs during a boot process of an electronic device according to various embodiments of this disclosure.

FIG. 6 illustrates a process for dynamically verifying trusted applications in an electronic device according to various embodiments of this disclosure. While the flow chart depicts a series of sequential steps, unless explicitly stated, no inference should be drawn from that sequence regarding specific order of performance, performance of stages, steps, or portions thereof serially rather than concurrently or in an overlapping manner, or performance of the steps depicted exclusively without the occurrence of intervening or intermediate steps. Operations of process 600 can be implemented in an electronic device, such as electronic device 101 in FIG. 2.

Flowchart 600 begins at operation 602 by confirming that the executable codes for booting an electronic device are from a trusted binary. In one embodiment, confirmation that the executable codes for booting the electronic device are from a trusted binary is achieved by running a Secure Boot process. In operation 604, the kernel boot sequence is initialized. Kernel modules, such as the TDVM, are invoked. In operation 606, a set of registered TAs are verified during the kernel boot sequence. Additional details for verifying the set of registered TAs are provided in flowcharts 800 and 900 that follow.

Figure 7:
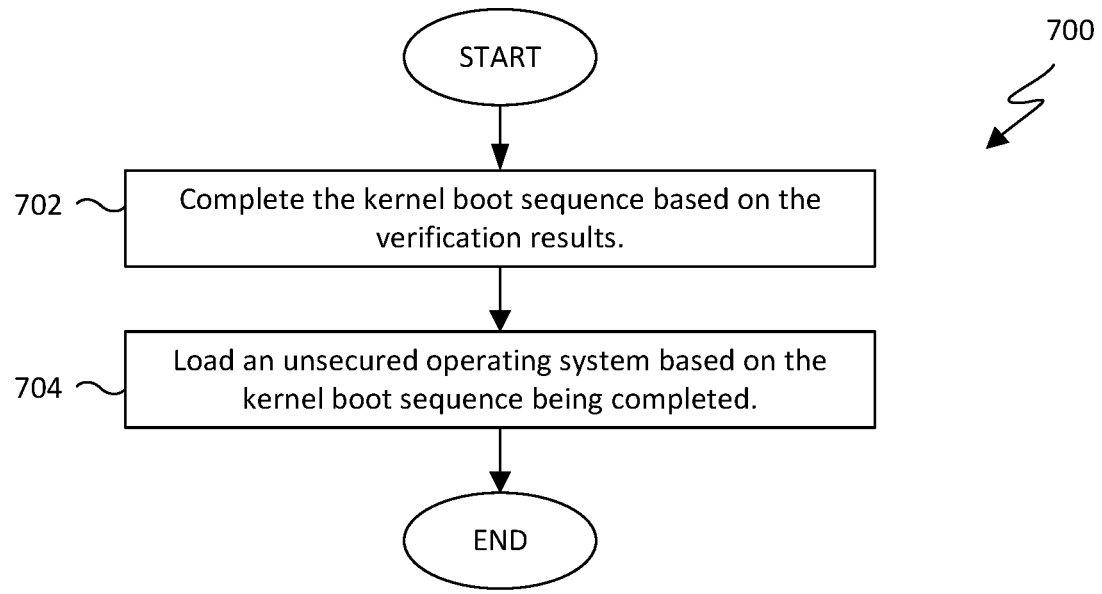
FIG. 7 illustrates a flowchart of a process for completing a boot process according to various embodiments of this disclosure.

FIG. 7 illustrates a flowchart of a process for completing a boot sequence according to various embodiments of this disclosure. While the flow chart depicts a series of sequential steps, unless explicitly stated, no inference should be drawn from that sequence regarding specific order of performance, performance of stages, steps, or portions thereof serially rather than concurrently or in an overlapping manner, or performance of the steps depicted exclusively without the occurrence of intervening or intermediate steps. Operations of process 700 can be implemented in an electronic device, such as electronic device 101 in FIG. 2.

Flowchart 700 begins at operation 702 by completing the kernel boot sequence based on the verification results. In some embodiments, the kernel boot sequence is only completed if every registered TA has been successfully verified. In another embodiment, the kernel boot sequence is allowed to complete even if one or more of the registered TAs have not been successfully verified provided that the unverified TA can be disabled without affecting operability of the electronic device. In operation 704 an unsecured OS is loaded based on the kernel boot sequence being completed.

Early in the unsecured OS boot process, the previously booted TAs are unloaded. The unloaded TAs will be reloaded but from a different place on the disk. That is, the TAs to be verified by bootloader are in a boot image, and copies of those TAs to be verified by TDVM 314 are in an ANDROID system image during kernel loading phase. This double verification mechanism can be used to prevent attacking from TA binary replacement during bootloader and kernel loading phases. In some embodiments, the reloaded TAs will undergo additional verification. For example, the TDVM 314 is loaded and verified by existing primitives that amount to a Secure Boot. Thereafter, the TDVM 314 generates a TA load request that is forwarded to the secure world by the TEE API 322. The TA load request is received by a monitor 324 and forwarded on to the secure OS 320. If the TA fails the corresponding signature check, then the TA is not loaded in the unsecure OS boot process is permitted to continue.

If the TA passes the corresponding signature check, then the TA is loaded, and the load result is returned to the TDVM

314. Thereafter, the TDVM 314 calls the TA's self-verification function for loaded TAs. If the returned status codes indicate that the self-verification function is "passed", then boot can proceed as normal. If the TA version or state are wrong, then the TA is deemed to have encountered an unrecoverable failure and the TA is treated as though it had failed a signature check. As a result, the TA will not permit its other functions to be called. If the RPMB fails to load the TA state, then retry logic may be implemented.

Boot of the unsecured OS eventually completes. At least one of the TAs in the electronic device is a security TA that includes enforcement mechanisms that can lock down the electronic device based on predetermined security policy. An exemplary TA is KNOX GUARD TA. Each of the enforcement mechanisms of this security TA is essentially stateless and operates by requesting that the security TA provide proof that it has successfully completed a self-check logic. If the security TA does not respond to requests, each enforcement mechanism will assume that the electronic device may have been compromised, and therefore will adopt its most restrictive posture. Since the implementation of the self-check logic must be run successfully before the security TA will respond to requests, the security TA will be in a known good state before allowing the enforcement mechanisms to relax. Efforts to, for example, unload the version of the TA was booted up in order to load an older version of the TA will fail assuming all versions of the TA include the same basic checks. Thus, when the TA is loaded and is able to check its state, the TA can determine that the state is not current and become disabled.

In some embodiments, security TAs like KNOX GUARD TA are verified early in the boot process to avoid potential race conditions that occurs when an enforcement mechanism begins but locks down the device because a timely response is not received. In other scenarios, if the security TA is not verified early enough, the boot process can fail and force reboot and causing an undesirable boot loop.

An example of an alternative policy is for Hypervisor Device Management (HDM). HDM basically locks down hardware devices for very-high-security customers, using a really low level mechanism (i.e., the hypervisor). For HDM, everything should be locked down before the ANDROID operating system has a chance to start up, so that the hardware essentially does not exist. In HDM's case, if the verification module fails to load HDM TA properly, a boot will fail, probably by forcing a reboot or probably causing a "bootloop".

Figure 8:
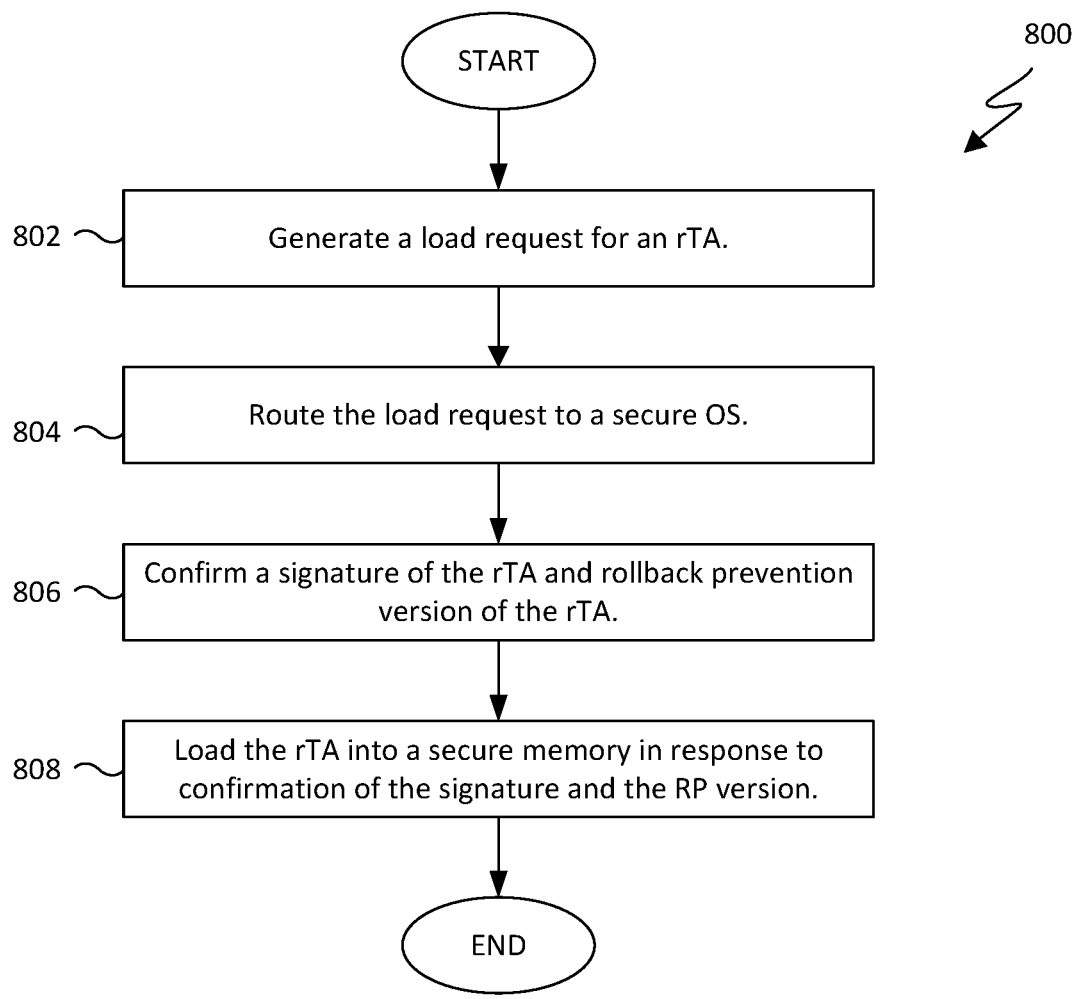
FIG. 8 illustrates a flowchart of a process for loading a set of registered TAs into memory as part of a process for verifying a set of registered TAs according to various embodiments of this disclosure.

FIG. 8 illustrates a flowchart of a process for loading a set of registered TAs into memory as part of a process for verifying a set of registered TAs according to various embodiments of this disclosure. While the flow chart depicts a series of sequential steps, unless explicitly stated, no inference should be drawn from that sequence regarding specific order of performance, performance of stages, steps, or portions thereof serially rather than concurrently or in an overlapping manner, or performance of the steps depicted exclusively without the occurrence of intervening or intermediate steps. Operations of process 800 can be implemented in an electronic device, such as electronic device 101 in FIG. 2.

Flowchart 800 begins at operation 802 by generating a TA load request for a registered TA. The TA load request is generated by the TDVM, such as TDVM 314 in FIG. 3. In operation 804, the load request is routed to a secure OS. The load request generated by the TDVM in the unsecured kernel can be routed to the secure OS in the secure kernel by sending the TA load request from the TDVM to a TEE API configured to communicate with a monitor in the secure kernel, which is then able to route the TA load request to the secure OS. In operation 806, a signature of the registered TA and a rollback prevention version of the registered TA are confirmed. Confirmation can be made by the secure OS. In operation 808, the registered TA is loaded into secure memory in response to confirmation of the signature and the rollback prevention version.

Figure 9:
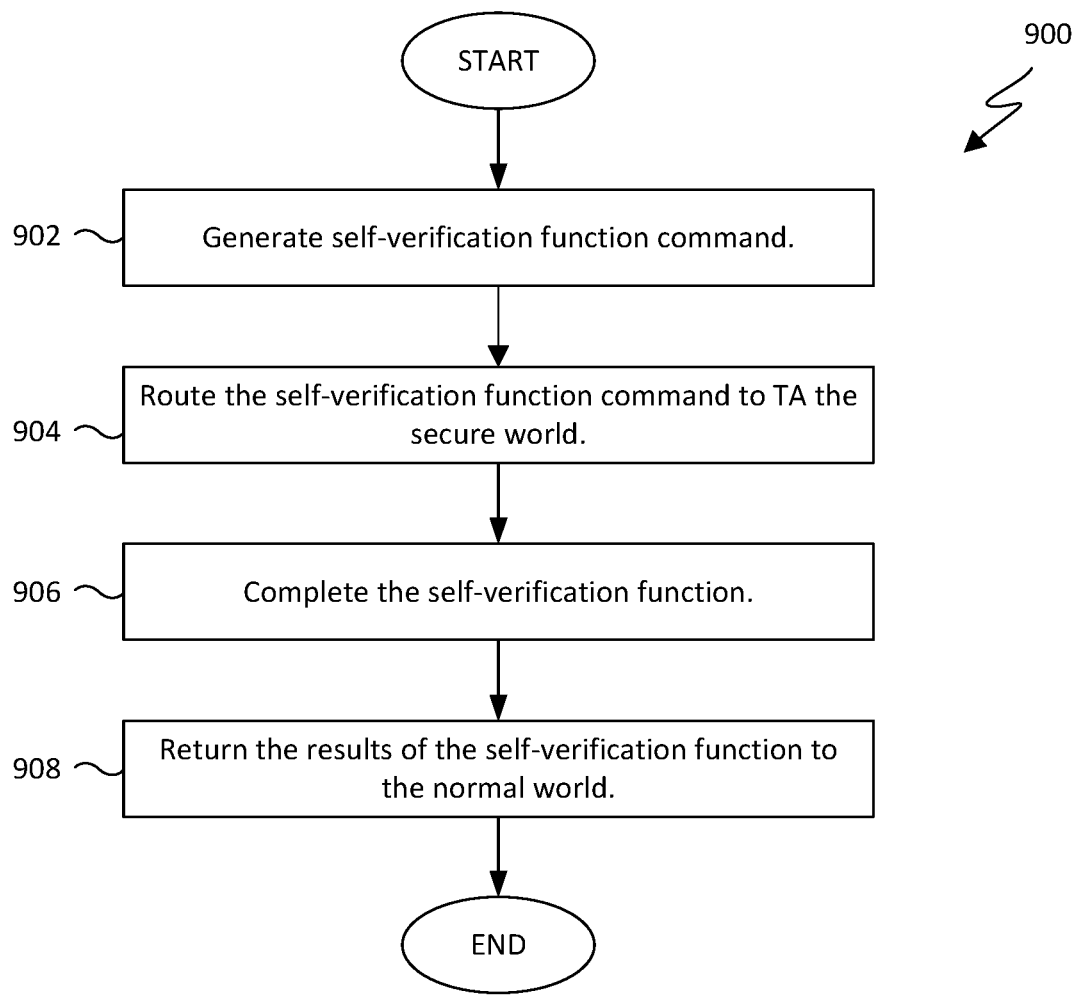
FIG. 9 illustrates a flowchart of a process for calling a self-verification function for a set of registered TAs loaded into memory as part of a process for verifying a set of registered TAs according to various embodiments of this disclosure.

FIG. 9 illustrates a flowchart of a process for calling a self-verification function for registered TAs loaded into memory as part of a process for verifying a set of registered TAs according to various embodiments of this disclosure. While the flow chart depicts a series of sequential steps, unless explicitly stated, no inference should be drawn from that sequence regarding specific order of performance, performance of stages, steps, or portions thereof serially rather than concurrently or in an overlapping manner, or performance of the steps depicted exclusively without the occurrence of intervening or intermediate steps. Operations of process 900 can be implemented in an electronic device, such as electronic device 101 in FIG. 2.

Flowchart 900 begins at operation 902 by generating a command to initiate a self-verification function. The self-verification function command can be generated by the TDVM after receiving confirmation that the corresponding registered TA has been successfully loaded into the secure world. In operation 904, the self-verification function command is routed to the appropriate TA in secure world. In a non-limiting embodiment, the self-verification function command is transmitted from the TDVM to the TEE API for routing to the secure world. The self-verification function command is received by a monitor in the secure world and forwarded on to the secure OS for transmission to the appropriate TA. The self-verification function is completed in operation 906. Results of the self-verification function are returned back to the normal world in operation 908. The results can indicate whether the self-verification function is "passed" or "failed". Additionally, in the event that the results indicate that the self-verification function is failed, then the results can also include diagnostic information and/or status codes.

Although this disclosure has been described with an exemplary embodiment, various changes and modifications may be suggested to one skilled in the art. It is intended that this disclosure encompass such changes and modifications as fall within the scope of the appended claims.

What is claimed is:

1. An electronic device comprising:
 a memory storing instructions and one or more registered trusted applications (TAs); and
 a processor operably connected to the memory, the processor configured to execute the instructions to cause the electronic device to:
  initialize a kernel boot sequence of the electronic device in response to confirming that executable codes for booting the electronic device are from a trusted binary; and
  during the kernel boot sequence, verify the one or more registered TAs can be loaded by a secure operating system (OS) of the electronic device and unloaded,
 wherein, to verify the one or more registered TAs, the processor is configured to execute the instructions to cause the electronic device to confirm, by the secure OS, a signature of a specified registered TA of the one or more registered TAs and a rollback prevention (RP) version of the specified registered TA, and wherein completion of the kernel boot sequence is based on verification results of the one or more registered TAs.

2. The electronic device of claim 1, wherein the processor is configured to execute the instructions to cause the electronic device to:
complete the kernel boot sequence based on the verification results indicating that a subset of the one or more registered TAs is verified; and
load an unsecured OS based on the kernel boot sequence being completed.

3. The electronic device of claim 1, wherein the processor is configured to execute the instructions to cause the electronic device to:
complete the kernel boot sequence based on the verification results indicating that each of the one or more registered TAs is verified, or terminate the kernel boot sequence without loading an unsecured OS based on the verification results indicating that any of the one or more registered TAs is not verified.

4. The electronic device of claim 1, wherein the verification results include at least one of a status code or diagnostic information.

5. The electronic device of claim 1, wherein, to verify the one or more registered TAs, the processor is configured to execute the instructions to cause the electronic device to:
generate, by a TA dynamic verification module (TDVM), a load request for the specified registered TA;
route, by a trusted execution environment (TEE) application programming interface (API), the load request to the secure OS; and
load, by the secure OS, the specified registered TA into a secure memory in response to the confirmation of the signature and the RP version by the secure OS.

6. The electronic device of claim 5, wherein the processor is configured to execute the instructions to cause the electronic device to:
call, by the TDVM, one or more self-diagnostic functions for the specified registered TA loaded into the secure memory, each of the one or more self-diagnostic functions pre-defined by an owner of the specified registered TA and corresponding to the specified registered TA, and
wherein the verification results comprise results of the one or more self-diagnostic functions.

7. The electronic device of claim 6, wherein the one or more self-diagnostic functions comprise at least one of:
performing a cryptographic function test;
performing a test on a secure random API;
verifying whether a replay protected memory block (RPMB) is accessible with valid data;
wrapping or unwrapping associated secured objects; or
verifying that a secure file system (SFS) is available.

8. A method for booting an electronic device, the method comprising:
initializing, by a bootloader of the electronic device, a kernel boot sequence in response to confirming that executable codes for booting the electronic device are from a trusted binary; and
during the kernel boot sequence, verifying, by a trusted application dynamic verification module (TDVM) of the electronic device, one or more registered trusted applications (TAs) can be loaded by a secure operating system (OS) of the electronic device and unloaded,
wherein verifying the one or more registered TAs comprises confirming, by the secure OS, a signature of a specified registered TA of the one or more registered TAs and a rollback prevention (RP) version of the specified registered TA, and
wherein completion of the kernel boot sequence is based on verification results of the one or more registered TAs, wherein a memory of the electronic device stores the one or more TAs.

9. The method of claim 8, further comprising:
completing, by the bootloader, the kernel boot sequence based on the verification results indicating that a subset of the one or more registered TAs is verified; and
loading, by the bootloader, an unsecured OS based on the kernel boot sequence being completed.

10. The method of claim 9, wherein:
the kernel boot sequence is completed, by the bootloader, based on the verification results indicating that each of the one or more registered TAs is verified, or
the kernel boot sequence is terminated without loading an unsecured OS, by the bootloader, based on the verification results indicating that any of the one or more registered TAs is not verified.

11. The method of claim 9, wherein the verification results include at least one of a status code or diagnostic information.

12. The method of claim 8, wherein verifying the one or more registered TAs further comprises:
generating, by the TDVM, a load request for the specified registered TA;
routing, by a trusted execution environment (TEE) application programming interface (API), the load request to the secure OS; and
loading, by the secure OS, the specified registered TA into a secure memory in response to the confirmation of the signature and the RP version by the secure OS.

13. The method of claim 12, further comprising:
calling, by the TDVM, one or more self-diagnostic functions for the specified registered TA loaded into the secure memory, each of the one or more self-diagnostic functions pre-defined by an owner of the specified registered TA and corresponding to the specified registered TA, and
wherein the verification results comprise results of the one or more self-diagnostic functions.

14. The method of claim 13, wherein the one or more self-diagnostic functions comprise at least one of:
performing a cryptographic function test;
performing a test on a secure random API;
verifying whether a replay protected memory block (RPMB) is accessible with valid data;
wrapping or unwrapping associated secured objects; or
verifying that a secure file system (SFS) is available.

15. A non-transitory computer-readable medium comprising instructions that, when executed by a processor of an electronic device having a memory that stores one or more registered trusted applications (TAs), are configured to cause the processor to:
initialize, by a bootloader of the electronic device, a kernel boot sequence in response to confirming that executable codes for booting the electronic device are from a trusted binary; and
during the kernel boot sequence, verify, by a trusted application dynamic verification module (TDVM) of the electronic device, the one or more registered TAs can be loaded by a secure operating system (OS) of the electronic device and unloaded,
wherein the instructions that when executed are configured to cause the processor to verify the one or more registered TAs comprise instructions that when executed are configured to cause the processor to confirm, by the secure OS, a signature of a specified registered TA of the one or more registered TAs and a rollback prevention (RP) version of the specified registered TA, and wherein completion of the kernel boot sequence is based on verification results of the one or more registered TAs.

16. The non-transitory computer-readable medium of claim 15, wherein the instructions when executed are further configured to cause the processor to:

complete, by the bootloader, the kernel boot sequence based on the verification results indicating that a subset of the one or more registered TAs is verified; and load, by the bootloader, an unsecured OS based on the kernel boot sequence being completed.

17. The non-transitory computer-readable medium of claim 16, wherein:

the kernel boot sequence is completed, by the bootloader, based on the verification results indicating that each of the one or more registered TAs is verified, or the kernel boot sequence is terminated without loading an unsecured OS, by the bootloader, based on the verification results indicating that any of the one or more registered TAs is not verified.

18. The non-transitory computer-readable medium of claim 15, wherein the instructions that when executed are configured to cause the processor to verify the one or more registered TAs comprise instructions that when executed are configured to cause the processor to:

generate, by the TDVM, a load request for the specified registered TA;

route, by a trusted execution environment (TEE) application programming interface (API), the load request to the secure OS; and load, by the secure OS, the specified registered TA into a secure memory in response to the confirmation of the signature and the RP version by the secure OS.

19. The non-transitory computer-readable medium of claim 18, wherein the instructions when executed are further configured to cause the processor to:

call, by the TDVM, one or more self-diagnostic functions for the specified registered TA loaded into the secure memory, each of the one or more self-diagnostic functions pre-defined by an owner of the specified registered TA and corresponding the specified registered TA, and wherein the verification results comprise results of the one or more self-diagnostic functions.

20. The non-transitory computer-readable medium of claim 19, wherein the one or more self-diagnostic functions comprise at least one of:

performing a cryptographic function test;

performing a test on a secure random API;

verifying whether a replay protected memory block (RPMB) is accessible with valid data;

wrapping or unwrapping associated secured objects; or verifying that a secure file system (SFS) is available.

* * * * *